US010310837B2

(12) United States Patent  
Collins et al.

(10) Patent No.: US 10,310,837 B2  
(45) Date of Patent: Jun. 4, 2019

(54) METHOD AND APPARATUS FOR UPDATING INDUSTRIAL ASSETS

(71) Applicant: General Electric Company, Schenectady, NY (US)

(72) Inventors: Clifford Alex Collins, San Ramon, CA (US); Stella Yu, San Ramon, CA (US); Venkata Chadalawada, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 15/247,371

(22) Filed: Aug. 25, 2016

(65) Prior Publication Data

US 2018/0060058 A1 Mar. 1, 2018

(51) Int. Cl.
*G06F 9/445* (2018.01)
*G06F 8/65* (2018.01)
(Continued)

(52) U.S. Cl.
CPC ......... *G06F 8/65* (2013.01); *G05B 19/41855* (2013.01); *H04L 41/0823* (2013.01); (Continued)

(58) Field of Classification Search
CPC ......... G06F 8/65; G06F 8/60; H04L 41/0813; H04L 67/12; H04L 67/34; H04L 41/08; H04L 41/0803; H04L 41/0823; H04L 41/0886; H04L 67/025; H04L 67/125; H04L 61/1511; H04L 61/1564; (Continued)

(56) References Cited

U.S. PATENT DOCUMENTS 5,418,953 A 5/1995 Hunt et al.
6,237,091 B1 5/2001 Firooz et al.
(Continued)

FOREIGN PATENT DOCUMENTS

EP 1580630 A2 9/2005
EP 2757498 A2 7/2014
(Continued)

*Primary Examiner* — Wei Y Zhen
*Assistant Examiner* — Mohammed N Huda
(74) *Attorney, Agent, or Firm* — Fitch, Even, Tabin & Flannery LLP

(57) ABSTRACT

A message is broadcast from an industrial device to a server. The message includes information identifying the type of the industrial device and indicates that the industrial device is to be configured. The message is received at the server, and at the server responsively determines correct configuration information associated with the type of the industrial device. The configuration information is transmitted from the server to the industrial device and a secure link is established between the server and the industrial device. The configuration information is received at the industrial device and the industrial device responsively ceases the broadcasting. Subsequently, the industrial device is configured according to the configuration information. Software from a storage unit is accessed according to the configuration information. Updated configuration information from the server to the industrial device over the secure link.

14 Claims, 3 Drawing Sheets

(51) Int. Cl.
  *H04L 12/24* (2006.01)
  *G05B 19/418* (2006.01)
  *H04L 29/08* (2006.01)

(52) U.S. Cl.
  CPC .............. *H04L 41/0886* (2013.01); *G05B 2219/31104* (2013.01); *H04L 67/12* (2013.01); *H04L 67/34* (2013.01)

(58) Field of Classification Search
  CPC ............ H04L 61/13045; H04L 61/301; H04L 61/305; H04L 61/6004; G05B 19/41855; G05B 2219/31104
  USPC .......................................... 717/172; 709/245
  See application file for complete search history.

(56) References Cited

U.S. PATENT DOCUMENTS

| | | |
|---|---|---|
| 7,412,548 B2 | 8/2008 | Sichner |
| 7,822,878 B2 | 10/2010 | Hausman et al. |
| 7,823,147 B2 | 10/2010 | Moshir et al. |
| 8,280,537 B2 | 10/2012 | Chand et al. |
| 8,595,331 B2 | 11/2013 | Henseler et al. |
| 8,635,316 B2 | 1/2014 | Barnhill, Jr. |
| 8,635,605 B2 | 1/2014 | Chancey et al. |
| 8,689,120 B2 | 4/2014 | McGreevy et al. |
| 8,713,562 B2 | 4/2014 | Dain |
| 8,892,689 B1 | 11/2014 | Mowry |
| 2003/0140150 A1 | 7/2003 | Kemp et al. |
| 2005/0028001 A1 | 2/2005 | Huang et al. |
| 2008/0065243 A1 | 3/2008 | Fallman et al. |
| 2009/0112566 A1 | 4/2009 | Chancey et al. |
| 2010/0131084 A1 | 5/2010 | Van Camp |
| 2010/0235614 A1 | 9/2010 | Callaghan et al. |
| 2012/0029656 A1 | 2/2012 | Colombo et al. |
| 2012/0239224 A1 | 9/2012 | McCabe et al. |
| 2013/0131843 A1 | 5/2013 | Gohr |
| 2013/0179878 A1 | 7/2013 | Dain |
| 2013/0212420 A1 | 8/2013 | Lawson et al. |
| 2014/0130033 A1 | 5/2014 | Alls et al. |
| 2014/0277806 A1 | 9/2014 | Keller et al. |
| 2014/0282458 A1 | 9/2014 | Gupta |
| 2016/0087933 A1* | 3/2016 | Johnson et al. ........ H04L 67/34 709/245 |
| 2017/0048280 A1* | 2/2017 | Logue et al. ....... H04L 61/1511 |

FOREIGN PATENT DOCUMENTS

| | | |
|---|---|---|
| EP | 2908194 A1 | 8/2015 |
| WO | 2016/144296 A1 | 9/2016 |
| WO | 2016/144297 A1 | 9/2016 |

* cited by examiner

METHOD AND APPARATUS FOR UPDATING INDUSTRIAL ASSETS

BACKGROUND

Technical Field

The subject matter disclosed herein generally relates to providing configuration and/or other types of updates to industrial assets.

Brief Description of the Related Art

In industrial operations, industrial machines and systems (assets) are monitored to ensure proper operation and/or detect anomalies which may arise. Sensors are typically used by or with these machines and systems to obtain measurements (e.g., temperature, pressure, flow, electrical current, or electrical voltage measurements to mention a few examples). The assets typically include software to perform various tasks. Configuration information is also utilized by these assets.

System integrators and complex system owners must deploy and maintain industrial control systems for their industrial assets. Control systems typically include control code, diagnostics code, and operating parameters. These assets may be controlled on a one-by-one basis in which individual assets are configured or managed separately from other assets.

A variety of approaches have been used to manage and update the software configuration and software used by industrial assets, including the use of manually updating the industrial assets using physical connections and/or components. In order to apply updates or upgrades to these control systems, an operator must typically approve the update and certain conditions must be met. Manually monitoring of conditions may be expensive, time intensive, and error prone.

Additionally, control code and diagnostics code oftentimes remains the same throughout the life of the industrial asset. In the event of a necessary update to an operating parameter of the industrial asset, the asset must be taken offline and the update must be provided to the asset. However, because the controls are coupled together, updates to parametric values and operation of the industrial asset oftentimes requires the transmittal of the unmodified control and diagnostics code in addition to the modified parametric value. These data packages may be large and thus require significant bandwidth and transmittal time.

The above-mentioned problems have resulted in some user dissatisfaction with previous approaches.

BRIEF DESCRIPTION OF THE INVENTION

The approaches described herein provide for the installation (or update) of software and/or configuration for industrial devices. When attaching a new industrial device into a network, the devices described herein will auto-configure by downloading the configuration information and software needed. Consequently, a complicated user interface (or in some case, any interface at all) is not needed at the industrial device, and the downloading of information is accomplished seamlessly and (in some examples) without the need for human intervention.

In many of these embodiments, a message is broadcast from an industrial device to a server. The industrial device does not know the IP address (or anything else about) of the server when it is connected.

The message includes information identifying the type of the industrial device and indicates that the industrial device is to be configured. The message is received at the server, and the server responsively determines correct configuration information associated with the type of the industrial device. The configuration information is transmitted from the server to the industrial device and a secure link is established between the server and the industrial device. The configuration information is received at the industrial device and the industrial device responsively ceases the broadcasting. Subsequently, the industrial device is configured according to the configuration information. Software from a memory storage unit is accessed according to the configuration information. Updated configuration information is transmitted from the server to the industrial device over the secure link.

In aspects, the industrial device is a medical device or is located at a factory or plant. In some examples, the updated configuration information is manually generated. In other examples, the updated configuration information is automatically generated.

In other aspects, the message is devoid of validation information. In other examples, the configuration information includes information that configures sensors at the industrial machine.

In some other aspects, the server includes a user interface configured to allow a user to initiate configuration updates. In other examples, the server operates the Fabric Configuration Service (FCS).

In others of these embodiments, an apparatus or system includes an industrial machine and a server. The industrial machine is configured to broadcast a message to a server, and the message includes information identifying the type of the industrial device and indicating that the industrial device is to be configured.

The server is configured to receive the message, and responsively determines correct configuration information associated with the type of the industrial device. The server is configured to transmit the configuration information to the industrial device and establish a secure link between the server and the industrial device. The industrial machine receives the configuration information at the industrial device and responsively ceases the broadcasting. The industrial machine subsequently is configured according to the configuration information. The industrial machine accesses software from a memory storage unit according to the configuration information. Updated configuration information is provided from the server to the industrial device over the secure link.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE DISCLOSURE

Approaches are provided for auto-configuring industrial devices by downloading the configuration and software needed. In aspects, these approaches may work automatically without the need for human intervention.

In one particular example, an industrial device (e.g., operated with Predix-compliant software) is started and broadcasts messages on a network in search of a particular server or service (e.g., the Fabric Configuration Service (FCS)). In this particular example, the FCS is an Open Service Gateway Initiative (OSGI) service running in the Predix Machine container (manufactured by General Electric Company). The sever pushes configuration files down to industrial devices. In aspects and when a new industrial device registers, the industrial device contains some "meta" information that describes what type of device it is and this meta information is used by the server to find the configuration files to be used for this device. The communication is performed using Predix network-type protocol, which is one example of a decentralized, un-brokered messaging system that can be used.

After the FCS-based server sends the configuration files to the industrial device, the industrial device will install the configuration files and determine the software needed for running the configuration. More specifically, the industrial device will use the configuration information to establish a connection to the OSGI bundle repository. It will then connect and download all bundles needed for this configuration. The industrial device is now running the software and configuration. Although the above approach can be used for initializing, connecting, and installing a new device to a network, it will be appreciated that these procedures can be used to re-install and/or update devices that are currently connected to a network.

It will be understood that by "industrial machine," "machine," "industrial asset," or "asset" and as used herein, it is meant any piece of industrial equipment that has a programmable logic controller or other computational device coupled thereto to drive its operation. Examples of assets include water processing plants, solar panels, aircraft engines, medical devices, wind farms, turbines, and the like. Other examples are possible.

Figure 1:
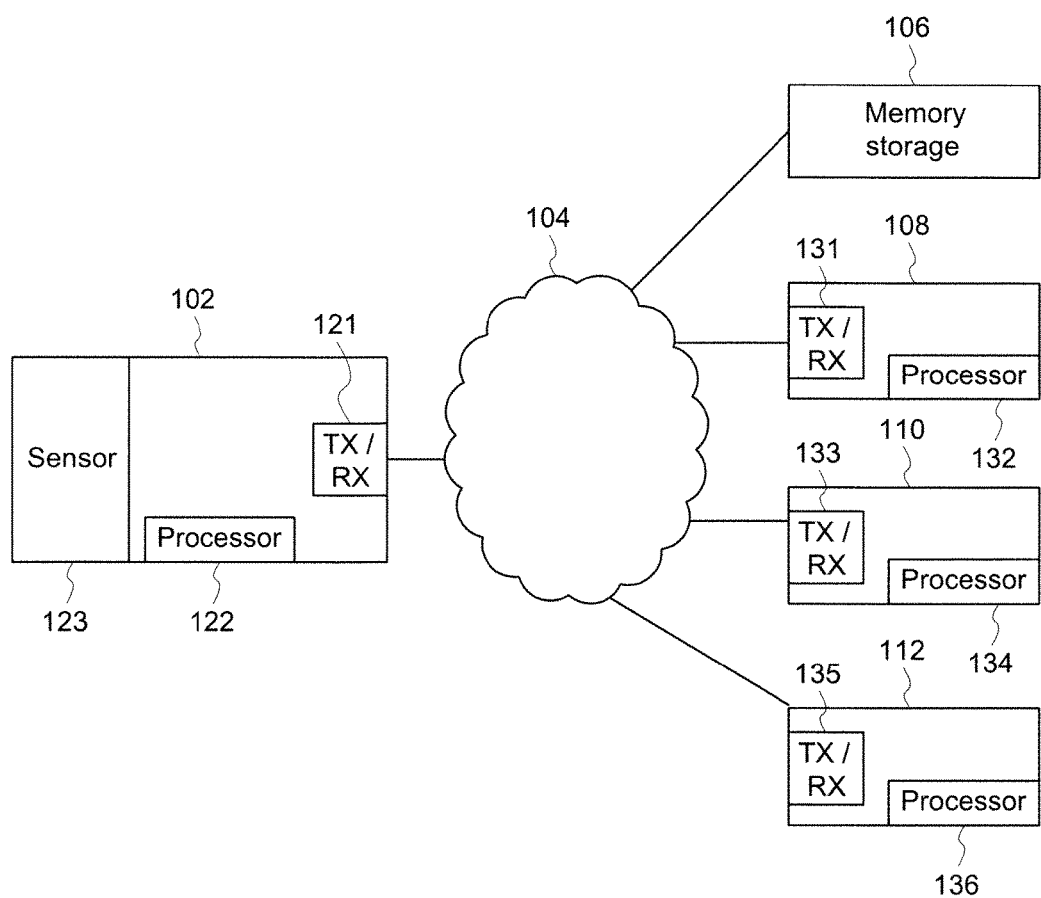
FIG. 1 comprises a block diagram of an apparatus or system for downloading configuration information and/or software to an industrial machine according to various embodiments of the present invention.

Referring now to FIG. 1, one example of a system or apparatus for configuring and/or downloading software to an industrial machine is described. The system includes an industrial device 102, a network 104, a memory storage device 106, and servers 108, 110, and 112.

The industrial device 102, includes a processor 122 and a transmitter/receiver 121. The processor 122 may be part of or be a programmable logic controller. Although only one processor is shown at the industrial device 102, it will be appreciated that the industrial device 102 may include multiple processors (or PLCs). As mentioned, the industrial device may be associated with an asset including a water processing plant, a solar panel, an aircraft engine, a medical device, a wind farm, a turbine, or the like. Other examples are possible. The industrial device 102 itself may be a pump, a valve, a switch, or any other type of device (or combinations of these devices) used in these or other systems. Other examples are possible. The industrial device 102 does not know the IP address (or anything else about) of the servers 108, 110, and 112 when it is connected.

The industrial device 102 (and its processor 122) may be configured with various parameters or other types of information. For example, the industrial device 102 may have measurement sensors 123 and the sensors obtain some type of measurement. In aspects, the sensors may sense temperature. In other examples, the sensors 123 may be industrial sensors operating according to the mod bus or Open Platform Communications-Unified Architecture (OPCUA) protocols.

The configuration information needed by the industrial device 102 may specify the units (e.g., Fahrenheit or Celsius) used by the sensors in obtaining a measurement. In other examples, the configuration information may specify operating characteristics of the processor 122. The configuration information may be in the form of parameter values, or computer code that may be executed by the processor 122.

The transmitter/receiver 121 broadcasts messages across the network to obtain configuration information. The transmitter/receiver 121 also receives configuration information (e.g., configuration files) from a particular server. Additionally, the transmitter/receiver 121 communicates with the memory device 106 (e.g., requesting software from the memory device 106 and receiving software from the memory device 106).

The network 104 is any type of network such as a wide area networker local area network. The network 104 can, in some examples be combinations of networks. The memory storage device 106 is any type of memory storage device. The network 104 may include gateways or routers. The servers 108, 110, and 112 are connected to the network 104 or in aspects may be considered a part of the network 104. It will be appreciated that the network 104 may couple to other networks (e.g., cellular networks or the Internet to mention two examples). These other networks may couple to still other user devices.

The servers 108, 110, and 112 include processors 132, 134, 136, and transmitter/receivers 131, 133, and 135. The processors 132, 134, and 136 receive broadcast messages from the industrial device 102 (via the transmitter/receivers 131, 133, 135), and process these messages. The messages may include information identifying the type of industrial device, or, in other examples, the type of service desired by the industrial device.

Responsively, a processor 132, 134, and/or 136 may determine whether it has (or has access to) configuration information (e.g., configuration files) relating to a specific type of industrial device. If it does not, the processor 132, 134, and 136 may take no further action (e.g., send no message to the industrial device). If the processor 132, 134, 136 has access to a particular configuration, it accesses the configuration information. The configuration information may be stored at a memory associated or within the processor, or at a memory at a different location.

The configuration information may be in any format and may also include in some examples software routines. In one particular example, the configuration information is a configuration file that includes parameters. Parameters may include measurement units (e.g., measurement units for pressure, temperature, voltage, speed, to mention a few examples) or numerical values (including constants used in equations). Other examples of configuration information are possible.

The configuration information is sent via transmitter/receivers 131, 133, and 135 to the industrial device (to be received at the transmitter/receiver 121 of the industrial device 102).

In one particular example of the operation of the system of FIG. 1, the industrial device 102 operates using Predix-type software. The industrial device 102 is physically connected to the network 104 and started (powered-up). The device 102 broadcasts messages on the network 104 in search of a particular server or service (e.g., the Fabric Configuration Service (FCS)).

All servers 108, 110, and 112 receive the message broadcast over the network 104. However, the sever 108 is the only server that recognizes that it has configuration files needed by (or associated with) the industrial device 102. Responsively, the server 108 pushes (transmits) the appropriate configuration files down to the industrial device 102. The message broadcast by the industrial device in some examples includes "meta" information that describes what type of device the industrial device 102 is and this meta information is used by the server 108 to find the configuration files to be used for this device. In aspects, the message is sent across the network 104 using Predix network-type protocol.

After the server 108 sends the configuration files to the device 102, the device 102 ceases broadcasting the message, installs the configuration files, and determines the software needed for running the configuration. The device 102 uses the configuration information to establish a connection to the memory device 106, which in this example is OSGI bundle repository. The device 102 then connects with the memory device 106 (via a communication link) and download all bundles (e.g., software files) needed for this configuration. The device 102 is now running the software and configuration designed for its device type.

After initial configuration is complete, the configuration may also be updated as can the software. The updates may be initiated by users at the servers (acting through a user interface to manually instruct the server to download updated configuration information). In other aspects, the updates can be automatic. In some examples, the server can detect when configuration information it has access to changes and this can automatically initiate an update (where the configuration information is automatically sent from the server to the industrial device 102).

Figure 2:
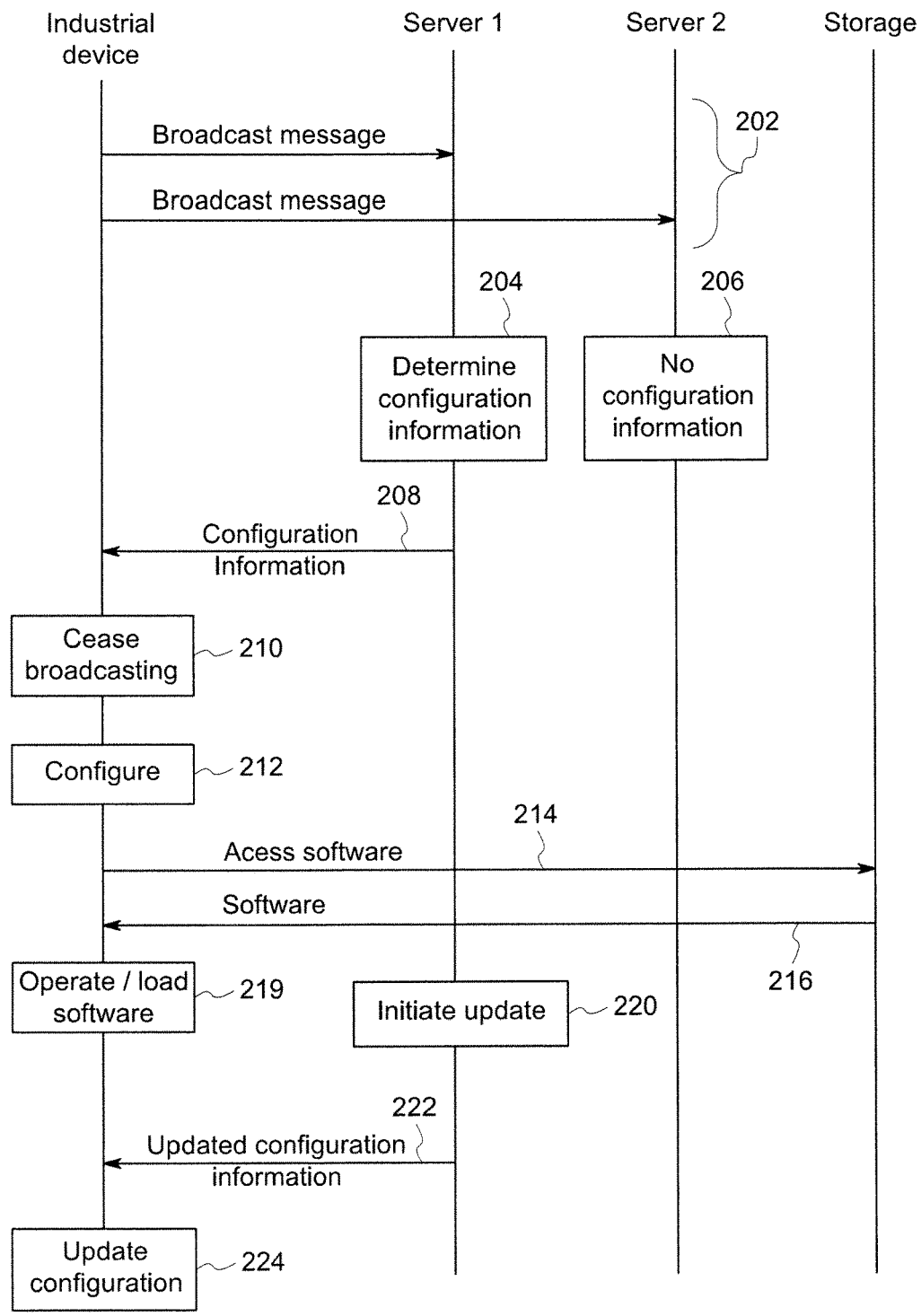
FIG. 2 comprises shows a communication diagram showing various communications between different entities in a system for downloading configuration information and/or software to an industrial machine according to various embodiments of the present invention.

Referring now to FIG. 2, one example of an approach for configuring an industrial machine is described. At step 202, a configuration request message is broadcast to a first server and a second server. By broadcast, it is meant that the message is sent without including a specific, intended destination. That is, any device that is listening can receive the message. As mentioned, the message may include information indicating a type of industrial device. Other types of information may also be included in the message.

At step 204, the first server determines that it has configuration information that should be sent to the industrial device. In some examples, the first server may be the type of server or provide a particular service desired by the industrial device. In other examples, the server may include configuration files of particular device types that match the type indicated in the broadcast message. The second server at step 206 determines that it need not provide information to the industrial device.

At step 208, the configuration information is provided from the first server to the industrial device. At step 210, the industrial device receives the configuration information and ceases broadcasting its configuration request message. At step 212, the industrial device configures itself with the configuration information. This may include setting parameters at the industrial device (e.g., setting measurement units of sensors) where the configuration information includes values for these parameters.

At step 214, the industrial device determines the software it needs to support its configuration and sends a message to a memory storage unit to obtain the software. The software may, for example, operate sensors at the industrial device or act as all or part of a control system at the industrial device. Other examples of software are possible. The request may specify exact software modules or may merely include information allowing the memory storage unit to determine the exact modules that are needed.

At step 216, the memory storage unit retrieves the software and sends the software to the industrial device. At step 218, the software is loaded into the industrial device and executed.

Later, at step 220, a configuration update is initiated. This update may be initiated manually by the user or automatically (e.g., a server may detect changes to or a new configuration file). If manually initiated, a user interface may be coupled to the server and a user may manually instruct a configuration update be made to a user-specified industrial device. At step 222, the configuration information is sent from the server to the industrial device. At step 224, the configuration is updated.

Configuration changes (whether initial or updates) results in physically changing features at the industrial machine. For example, the configuration information may include parameters (e.g., measurement units for sensors) stored in a memory at the industrial device. The configuration process physically changes these parameters. These parameters are used when software is executed at the industrial device. For example, software operates the sensors and uses the measurement units stored in memory to operate.

Figure 3:
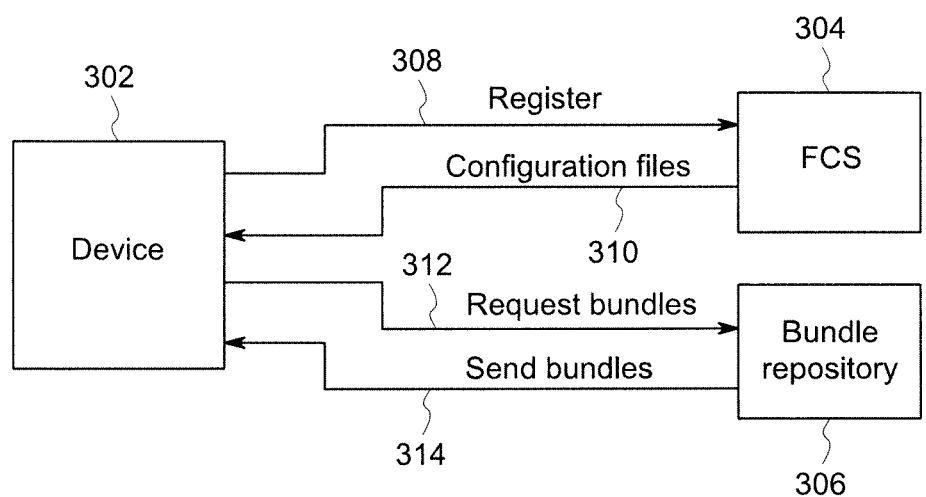
FIG. 3 comprises a block diagram of an apparatus or system for downloading configuration information and/or software to an industrial machine according to various embodiments of the present invention.

Referring now to FIG. 3, another approach for configuring industrial devices is described. A system includes an industrial device 302, a Fabric Configuration Service (FCS) server 304, and a bundle repository 306. The industrial device 302 may be similar or the same as the industrial device 102 described above. The FCS server may provide the Fabric Configuration Service. The bundle repository 306 may be a memory storage unit, database, or memory device that stores software used by the industrial device 302 to operate the industrial device.

In one example of the operation of the system of FIG. 3, at step 308 a registration message is broadcast from the industrial device 302. The registration message is a request to be configured (i.e., for a server to send the industrial device configuration files). The message is broadcast across a network (or in some examples, multiple networks) and includes information including, for example, the type of device, or the type of service desired. In this case, the message indicates the desire for a FCS service to be provided.

At step 310, the FCS server receives the message, recognizes that it should provide configuration files, and sends the files to the industrial device 302. The industrial device 302 configures itself with information in the configuration files.

For example, the configuration files may include parameters, which may be loaded into the industrial device (e.g., into a memory or PLC at the industrial device 302).

The industrial device 302 determines from the configuration files (and possibly other sources) the software it needs to operate. For example, the configuration files may indicate sensor information, indicating that the industrial device needs sensor software. A request for this software is sent at step 312 to the bundle repository 306. The bundle repository 306 obtains the requested software and sends it to the industrial device at step 314. The request may request exact software bundles (files, routines, subroutines, pieces of code) or include information allowing the repository 306 to identify these bundles. The communication link to the repository 306 may not include the FCS server 304 (i.e., it does not follow the same path as the broadcast messages from the industrial device 302).

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, comprising:
broadcasting a message from an industrial device to a first server, a second server, and a third server, and receiving the message at the first server, the second server, and the third server, the industrial device including a processor and a sensor, the industrial device being a switch, a valve, a medical device, a turbine, a wind-farm, or an engine, the sensor measuring a value, the message including information identifying the type of the industrial device and indicating that the industrial device is to be configured, the industrial device not knowing the address and not using the address of the first server, the second server, and the third server, wherein a single one of the first server, the second server, and the third server has and identifies configuration information associated with the type of the industrial device, the broadcasting of the message continuing from the industrial device until the configuration information is received at the industrial device, and wherein ones of the first server, the second server, and the third server not having the configuration information ignore the message;
wherein the first server includes the configuration information and retrieves the configuration information at the first server using the type;
wherein the second server does not include the configuration information and ignores the message;
wherein the third server does not include the configuration information and ignores the message;
transmitting the configuration information from the first server to the industrial device and establishing a secure link between the first server and the industrial device;
receiving the configuration information at the industrial device and responsively ceasing the broadcasting;
subsequently configuring the industrial device according to the configuration information, the configuring including entering a parameter value of a sensor or adjusting operation of the processor at the industrial machine;
at the industrial device identifying software needed to support the configuration and accessing the identified software from a storage unit according to the type of device indicated in the configuration information, the storage unit being separate from the first server, the second server, the third server and the industrial machine.

2. The method of claim 1, wherein the industrial device is a device located at a factory or plant.

3. The method of claim 1, wherein the updated configuration information is manually generated.

4. The method of claim 1, wherein the updated configuration information is automatically generated.

5. The method of claim 1, wherein the message is devoid of validation information.

6. The method of claim 1, wherein the server includes a user interface configured to allow a user to initiate configuration updates.

7. The method of claim 1, wherein the server operates the Fabric Configuration Service (FCS).

8. An apparatus, comprising:
a first server, a second server, and a third server;
an industrial device that is configured to broadcast a message to each of the first server, the second server, and the third server, the industrial device including a processor and a sensor, the industrial device being a switch, a valve, a medical device, a turbine, a wind-farm, or an engine, the sensor measuring a value, the message including information identifying the type of the industrial device and indicating that the industrial device is to be configured, wherein a single one of the first server, the second server, and the third server has configuration information associated with the type of the industrial device, the broadcasting of the message continuing from the industrial device to all of the servers until the configuration information is received at the industrial device, and wherein ones of the first server, the second server, and the third server not having the configuration information ignore the message;
wherein the first server includes the configuration information and retrieves the configuration information at the first server using the type;
wherein the second server does not include the configuration information and ignores the message;
wherein the third server does not include the configuration information and ignores the message;
wherein the first server identifies the configuration information specifically associated with the type of the industrial device the first server being configured to transmit the configuration information to the industrial device and establish a secure link between the first server and the industrial device;
wherein the industrial device receives the configuration information and responsively ceases the broadcasting, the industrial device subsequently being configured according to the configuration information, the configuring including entering a parameter value of a sensor or adjusting operation of the processor at the industrial machine, the industrial device identifying software needed to support the configuration and accessing the identified software from a storage unit according to the type of device indicated in the configuration information, the storage unit being separate from the first server, the second server, the third server and the industrial machine.

9. The apparatus of claim 8, wherein the industrial device is a device located at a factory or plant.

10. The apparatus of claim 8, wherein the updated configuration information is manually generated.

11. The apparatus of claim 8, wherein the updated configuration information is automatically generated.

12. The apparatus of claim 8, wherein the message is devoid of validation information.

13. The apparatus of claim 8, wherein the server includes a user interface configured to allow a user to initiate configuration updates.

14. The apparatus of claim 8, wherein the server operates the Fabric Configuration Service (FCS).

* * * * *